(12) United States Patent
Meador et al.

(10) Patent No.: US 6,855,433 B1
(45) Date of Patent: Feb. 15, 2005

(54) MECHANICALLY RESILIENT POLYMERIC FILMS DOPED WITH A LITHIUM COMPOUND

(75) Inventors: Mary Ann B. Meador, Strongsville, OH (US); James D. Kinder, Canfield, OH (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 10/874,008

(22) Filed: Jun. 16, 2004

Related U.S. Application Data

(62) Division of application No. 10/147,477, filed on May 13, 2002.

(51) Int. Cl.[7] .............................. B32B 27/28; C08L 77/06
(52) U.S. Cl. .................... 428/473.5; 428/689; 525/436; 528/338
(58) Field of Search ....................... 525/436; 428/473.5, 428/689; 528/338

(56) References Cited

U.S. PATENT DOCUMENTS

| | | | |
|---|---|---|---|
| 5,468,571 A | 11/1995 | Fujimoto et al. | 429/217 |
| 5,888,672 A | 3/1999 | Gustafson et al. | 429/314 |
| 6,001,507 A | 12/1999 | Ono et al. | 429/217 |
| 6,201,945 B1 | 3/2001 | Schlueter, Jr. et al. | 399/329 |
| 6,245,881 B1 | 6/2001 | Faure et al. | 528/353 |

FOREIGN PATENT DOCUMENTS

| JP | 6-228310 | * 8/1994 |
|---|---|---|

OTHER PUBLICATIONS

Katsuya Asao and Motonori Mitoh, Polyimides (containing ether linkages; Adhesive Properties), in Concise Polymeric Materials Encyclopedia, 1202 (Joseph C. Salamone ed., CRC Press 1999).

* cited by examiner

*Primary Examiner*—Ana Woodward
(74) *Attorney, Agent, or Firm*—Kent N. Stone; James V. Tura

(57) ABSTRACT

This invention is a series of mechanically resilient polymeric films, comprising rod-coil block polyimide copolymers, which are doped with a lithium compound providing lithium ion conductivity, that are easy to fabricate into mechanically resilient films with acceptable ionic or protonic conductivity at a variety of temperatures. The copolymers consists of short-rigid polyimide rod segments alternating with polyether coil segments. The rods and coil segments can be linear, branched or mixtures of linear and branched segments. The highly incompatible rods and coil segments phase separate, providing nanoscale channels for ion conduction. The polyimide segments provide dimensional and mechanical stability and can be functionalized in a number of ways to provide specialized functions for a given application. These rod-coil black polyimide copolymers are particularly useful in the preparation of ion conductive membranes for use in the manufacture of fuel cells and lithium based polymer batteries.

4 Claims, No Drawings

MECHANICALLY RESILIENT POLYMERIC FILMS DOPED WITH A LITHIUM COMPOUND

This is a divisional application Ser. No. 10/147,477, which was filed on May 13, 2002. +gi

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

Field of the Invention

This invention relates to rod-coil block polyimide copolymers and more specifically to a series of rod-coil block co-polymers that are easy to fabricate, form dimensionally stable films with good ion conductivity at a wide range of temperatures for use as separator materials for a variety of applications. The polymers consist of short rigid rod segments alternating with flexible ether coil segments. A unique feature of these polymers is that the highly incompatible rods and coils phase separate giving nanoscale channels for ion conduction. The conduction of ions may be in the coil phase or rod phase or both. The rod phase also provides dimensional and mechanical stability to the polymer system. More specifically, suitable functionality can be introduced into the rods or coil segments to produce or enhance the transport of lithium ions for lithium polymer battery applications or transport of protons for fuel cell applications. Other uses for these rod-coil polyimide polymers include, but are not limited to ion sensors, chemical sensors, water purification, optical wave guides and the like.

Although the prior art fails to disclose block copolymers comprising short rigid polyimide rod segments alternating with polyether coil segments as taught by this invention, the Aso et al publication discloses polyimides containing ether linkages that exhibit excellent thermal and thermo-oxidative stability. These polyimides are stated to be useful as films, composites, membranes, and adhesives; see Aso and Mononori, Polyimides containing ether linkages in Concise Polymeric Materials Encyclopedia, 1202 J. C. Salamone, CRE Press, 1999.

Additional prior art includes U.S. Pat. No. 5,468,571 which discloses a battery with a negative electrode comprising carbon powder consolidated with a polyimide binder. The polyimide may be either a thermosetting polyimide or a thermoplastic polyimide. A representative example of polyimide resins is obtained by heat curing a solution of a polyamide acid (a polyimide intermediate) in N-methyl-2-pyrrolidone. The polyamide acid is obtained by reacting an aromatic diamine with an aromatic tetracarboxylic acid anhydride. U.S. Pat. No. 6,001,507 also discloses a non-aqueous electrolyte battery using a binder comprising a polyimide. The polyimides are prepared by reacting tetracarboxylic acid dianhydrides, such as pyromellitic dianhydride (PMDA), and diamines, such as bis (4-aminophenyl) ether (ODA), in an appropriate solvent to obtain polyamic acids, after which cyclodehydrating agents dehydrates the polymer.

SUMMARY OF THE INVENTION

This invention relates to polyimide rod-coil block copolymers and more specifically to the use of these copolymers as membrane materials for ion conduction. The polymers consist of short rigid rod segments alternating with flexible coil segments. The rod and coil segments can be linear, branched or mixtures of linear and branched. The polymers provide dimensional thermal stability and good ion conductivity. These polymers can be used in preparing fuel cells, lithium polymer batteries, ion sensors and the like.

The rod-coil block polyimide copolymers of this invention are characterized by the general formula:

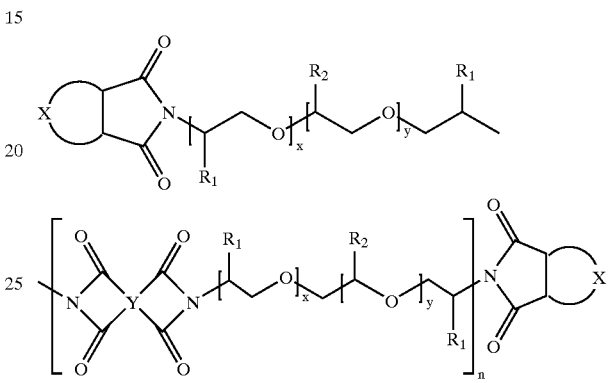

wherein $R_1$ is selected from the group consisting of hydrogen, alkyl radicals, and alkoxy radicals, $R_2$ is selected from the group consisting of hydrogen, alkyl radicals, and alkoxy radicals, and X is selected from the group consisting of aromatic radicals, heterocyclic radicals, and aliphatic radicals, wherein x is equal to or greater than zero, y is equal to or greater than zero and n is equal to or greater than one. The alkyl or aliphatic and alkoxy radicals are radicals having from 1 to 8 carbons or higher and preferably 1 to 4 carbons. $R_1$ and $R_2$ are not limited and may include various other known substituents.

Accordingly, it is an object of this invention to provide block copolymers consisting of short rigid polyimide rod segments alternating with flexible ether coil segments.

It is another object of this invention to provide block copolymers containing polyimide rod segments and polyether coil segments that are either linear, branched or a combination thereof wherein the highly incompatible rods and coil segments may phase separate providing nonoscale channels for ion conduction.

It is another object of this invention to provide block copolymers containing polyimide rod segments and polyether coil segments wherein the incompatibility between the polyimide rod and polyether coil segments provide good phase separation, and a high degree of order in the system wherein lithium ions can travel leading to high-ionic conductivity in the polymer for its use in preparing lithium batteries.

It is a further object of this invention to provide block copolymers containing polyimide rod segments and polyether coil segments for use in the preparation of fuel cells wherein the polyether coil segments allows the polymer to hold water at high temperatures in comparison to the polyimides without the polyether coil segments.

It is a further object of this invention to provide mechanically resilient polymeric films having ion conductivity comprising rod-coil block polyimide copolymers.

It is still a further object of this invention to provide block copolymers containing polyimide rod segments and polyether coil segments for use in the preparation of fuel cells wherein the polyimide rod segment contains suitable functional groups for proton conduction and may provide good phase separation with the polyimide polyether coil segments.

These and object of this invention will become more apparent from a further and more detailed description of the invention.

DESCRIPTION OF THE PREFERRED EMBODIMENTS

This invention relates to a series of rod-coil block polyimide copolymers that are easy to fabricate into mechanically resilient films with acceptable ionic or protonic conductivity at a variety of temperatures depending on the ultimate application. The polymers consist of short-rigid polyimide rod segments alternating with flexible polyether coil segments. The rods and coil segments can be linear, branched or mixtures of linear and branched. The highly incompatible rod and coil segments phase separate providing nanoscale channels for ion conduction. The polyimide segments provide dimensional and mechanical stability. In addition, the polyimide segments can be functionalized in any number of ways to provide specialized functions for a given application. For example, acid groups can be placed on the polyimide rod for proton conduction. The polyether coils have the added advantage of being able to coordinate with a wide variety of organic or inorganic additives to enhance the desired properties of the system for a particular application. For example, it is established that polyethers are excellent coordinating agents for lithium compounds.

The commercial potential of these copolymers is quite high. The use of these rod-coil copolymers could substantially decrease the operating temperatures of lithium polymer batteries, allowing for use in aerospace and terrestrial applications. In addition, these polymers can be functionalized for proton conduction for use as fuel cell membranes for low and high temperature applications. The coil segments are hydrophilic which allow the polymers to retain moisture at higher temperatures. Ultimately, the payoffs for developing solid polymer electrolytes that can operate in a wide range of temperatures are safety, convenience and cost. By eliminating the need for solvents in typical battery applications, flammability problems are reduced, fabrication is greatly simplified and power would not be consumed by keeping the battery warm. Moreover, by eliminating the need for excess moisture in fuel cell membranes, fuel cells will be able to operate at elevated temperatures providing greater efficiency.

A unique feature of the present invention is the use of polyimide technology in the production of rod coil polymers. Synthesis of the polymers is facile and versatile. In addition, the incompatibility between the polyimide rod and polyether coil segments provides good phase separation and a high degree of order in the system. For example, in lithium polymer battery applications, this ordering creates channels in which the lithium ions can travel freely, leading to high ionic conductivity. Suitable substitution in either the rod or coil segments can lead to systems with lithium ion transference numbers as high as one. In fuel cell applications, the incorporation of the polyether coils allows the polymer to hold water at higher temperatures then the polyimide without the coils. In addition, suitable substitution and/or doping leads to increased properties of water retention and proton conduction at a wide range of temperatures. It is also anticipated that the cost of producing the rod coil polymers will be significantly lower than the currently used perfluorosulfonic polymers.

Presently the lithium based polymer batteries for aerospace applications need the ability to operate in temperatures ranging from −70° C. to +70° C. Current state of the art solid polymer electrolytes (based on amorphous polyethylene oxide, PEO) have acceptable ionic conductivities (10-4 to 10-3 S/cm) only above 6° C. PEO itself has moderate lithium ionic conductivity at room temperature (10-6 S/cm). In addition, it is difficult to process, and except for very high molecular weights, not very dimensionally stable. Higher conductivity can be achieved in the current polymer systems by adding solvent or plasticizers to the solid polymer to improve ion transport. However, this may compromise dimensional and thermal stability of the electrolyte, as well as compatibility with electrode materials. Hence, there is a push to develop new electrolytes having unique molecular architecture, and/or novel ion transport mechanisms leading to good ionic conductivity at room temperature and below with no solvent or plasticizers. Some of these new approaches include comb polymers (Electrochimica Acta, 43, 1177–1184, 1998), hyperbranched systems (Macromolecules, 29, 3831–3838, 1996), highly ordered Langmuir-Blodgett films (J. Power Sources, 97–98, 641–643, 2001) and polyphosphazenes (Chemistry of Materials, 13, 2231–2233, 2001). While all of the aforementioned approaches give a higher conductivity then PEO, it is not high enough for future applications, and all suffer from poor dimensional stability.

In addition, the block polymers of this invention can be useful in the preparation of fuel cells. Fuel cells would operate at higher efficiency at temperatures above 80° C. due to better kinetics of redox reactions occurring within the cell. Catalysts are also less susceptible to contamination at elevated temperatures. The current state of the art material for polymer electrolyte membranes (PEM) for fuel cell applications are the perfluorosulfonic polymers. In addition to their high cost, the perfluorosulfonic polymers have limited utility above 80° C. due to the loss of water in the polymer membrane. The loss of water in the polymer has been attributed to the hydrophobic nature of the polymer backbone. This loss of water significantly reduces proton conduction in the membrane which reduces the efficiency of the fuel cell. An additional disadvantage of the perfluorosulfonic polymers in fuel cell applications is the long term stability of the membranes.

The rod-coil block polyimide copolymers of this invention are characterized by the general formula:

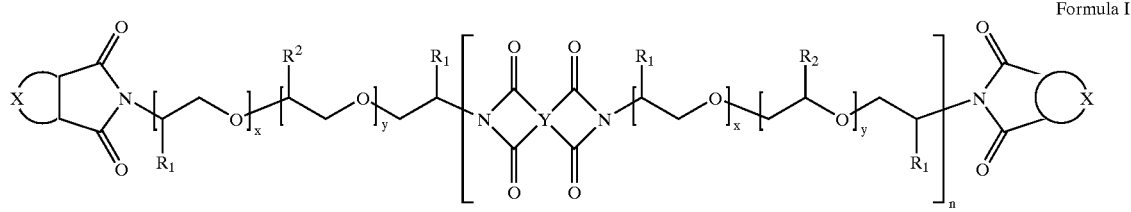

Formula I wherein "Y" is an organic radical i.e. an aromatic radical, substituted aromatic radical, heterocyclic radical or aliphatic radical, $R_1$ is selected from the group consisting of hydrogen, alkyl radicals and alkoxy radicals, $R_2$ is selected from the group consisting of hydrogen, alkyl radicals and alkoxy radicals, and X is selected from the group consisting of aromatic radicals, substituted aromatic radicals, heterocyclic radicals, and aliphatic radicals, wherein "x" is equal to or greater than zero, "y" is equal to or greater than zero, and "n" is equal to or greater than one.

In formula I, the preferred "Y" radicals are aromatic and include, but are not limited to, the specific following formulae: II, III, IV, V and VI.

In each of the above Formulae: I, II, III, IV, and V; $R_1$ and $R_2$ are the same or different and are selected from the group consisting of hydrogen, alkyl radicals, and alkoxy radicals, $R_3$ and $R_4$ are the same or different and are selected from the group consisting of nil, carbonyl radicals, methylene radical, hexafluoroisopropylidene radical and oxygen, and $R_5$, $R_6$, $R_7$, and $R_8$ are the same or different and are selected from the group consisting of hydrogen, fluorine (1), $CF_3$, alkyl radicals, alkoxy radicals, sulfonate radicals and alkyl sulfonate radicals, wherein "m" is equal to or greater than one, X is an aromatic, substituted aromatic, heterocyclic, or aliphatic radical, "x" is equal to or greater than zero, and "y" is equal to or greater than zero and "n" is equal to or greater

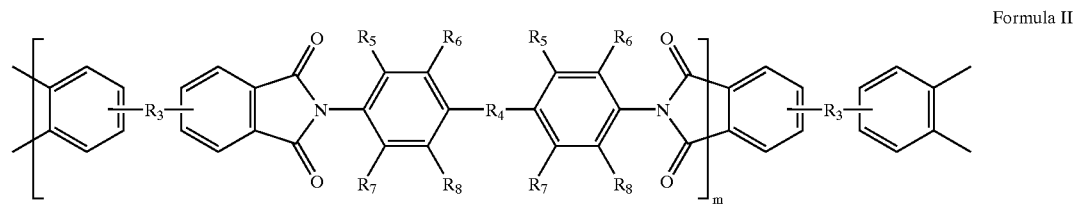

Formula II

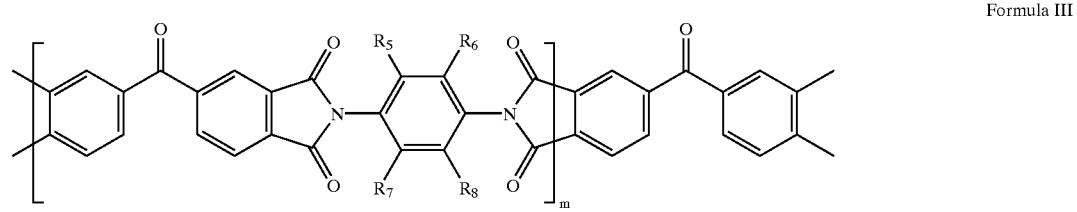

Formula III

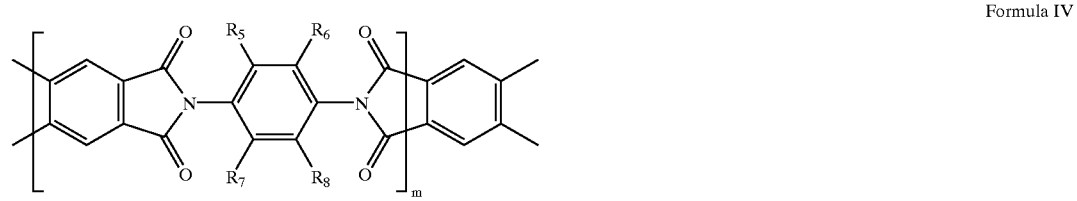

Formula IV

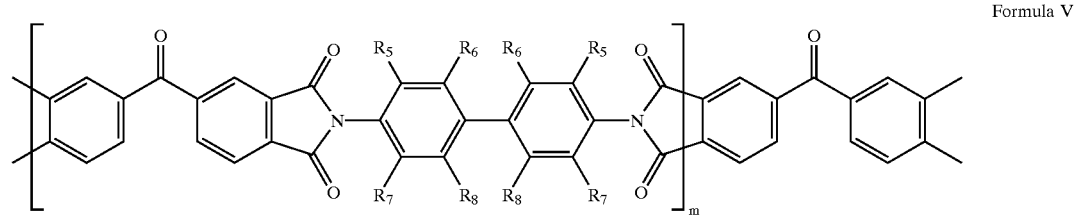

Formula V than one. In these formulae, the alkyl, alkoxy radicals and alkyl sulfonate radicals are radicals of 1 to 8 carbons or higher and preferably 1 to 4 carbons.

The following specific examples illustrate the method of preparing the rod-coil block polyimide copolymers of this invention.

Formula VI

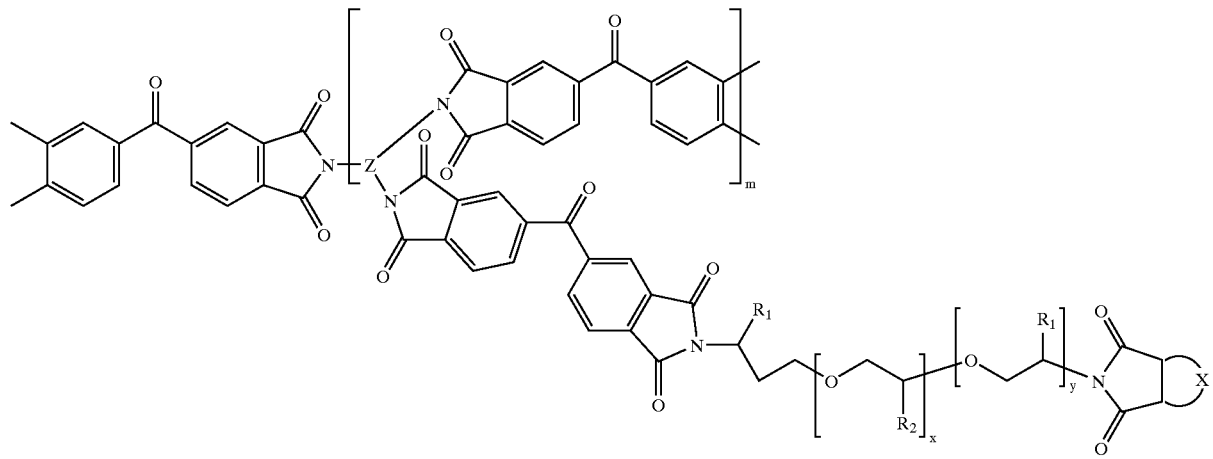

In formula VI, $R_1$ and $R_2$ are the same or different radicals selected from the group consisting of hydrogen, alkyl radicals and alkoxy radicals, "m" is equal to or greater than one, "x" is equal to or greater than one, "y" is equal to or greater than zero, X is selected from the group consisting of aromatic radicals, substituted aromatic radicals, heterocyclic radicals and alkyl radicals, and Z is an organic radical preferably selected from the group consisting of aromatic, heterocyclic and aliphatic radicals including:

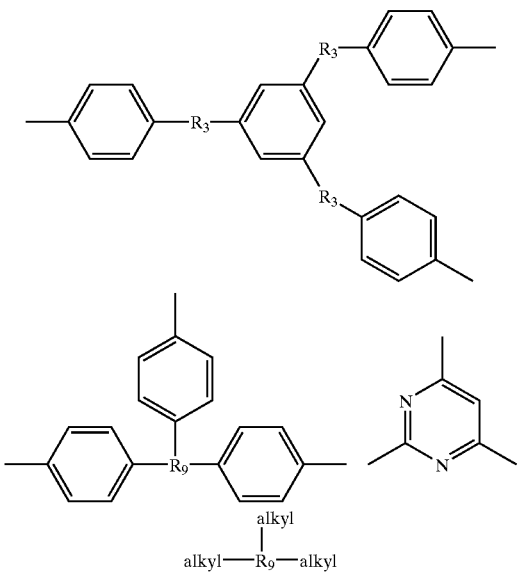

wherein the above formulae, $R_3$ is selected from the group consisting of nil, carbonyl radicals, oxygen, methylene radical and hexafluoroisopropylidene, and $R_9$ is selected from the group consisting of nitrogen, aromatic radicals, substituted aromatic radicals, heterocyclic radicals, aliphatic radicals and hydroxy aliphatic radicals wherein the aliphatic group has from 1 to 8 carbons preferably 1–4 carbons such as hydroxymethyl, hydroxyethyl, hydroxypropyl and the like.

EXAMPLE 1

Synthesis of a Linear Rod-Coil Polymer

A mixture of 3.72 g 3,3',4,4'-benzophenonetetracarboxylic dianhydride and 15.55 g 2000 number average molecular weight polyoxyalkylene diamine (XTJ-502, Huntsman Corp.) and 0.59 g phthalic anhydride in 30 ml anhydrous tetrahydrofuran was stirred for 24 hours at room temperature under inert conditions to dissolve. 4,4'-diaminobenzene (0.62 g) was added along with another 20 ml tetrahydrofuran and stirring was continued to another 3 hours. The resultant highly viscous polyamic acid solution was cast onto a flat plate. The resultant film was dried at 30° C. for 24 hours. After drying, it was cured in a vacuum oven at 200° C. for 3 hours to give 20 g of rubbery, yellow polyimide film with a formulated molecular weight of 10000. The polyamic acid solution is mixed with LiN($CF_3SO_2$)$_2$ salt (4.99 g) and cast onto a flat plate then cured the same way as undoped film.

EXAMPLE 2

Synthesis of a Branched Rod-Coil Polymer

A mixture of 3.32 g 3,3', 4,4'-benzophenonetetracarboxylic dianhydride and 15.06 g 2000 number average molecular weight polyoxyalkylene diamine (XTJ-502, Huntsman Corp.) and 0.71 g phtalic anhydride in 30 ml anhydrous tetrahydrofuran was stirred for 24 hours at room temperature under inert conditions to dissolve. 1,3,5-(4,4',4"-triaminophenyl)-benzene (1.37 g) was added along with another 20 ml tetrahydrofuran and stirring was continued for another 3 hours. The resultant highly viscous polyamic acid solution was cast onto a flat plate. The resultant film was dried at 30° C. for 24 hours. After drying, it was cured in a vacuum oven at 200° C. for 3 hours to give 20 g of rubbery, yellow polyimide film with a formulated molecular weight of 30000. The polyamic acid solution is mixed with LiN($CF_3SO_2$)$_2$ salt (4.83 g) and cast onto a flat plate and then cured the same way as undoped film.

EXAMPLE 3

Synthesis of a Sulfonated Rod-Coil Polymer

To stirred solution of 4.116 g of 3,3',4,4'-benzophenonetetracarboxylic dianhydride (BTDA) in 50 ml of dry 1-methyl-2-pyrrolidinone (NMP) was added 2.194 g of 4,4'diamino-2,2'-biphenyldisulfonic acid and 2.22 ml of triethylamine. The solution was stirred at 110° C. for 6 hours then 4.032 g of a 600 number average molecular weight polyoxyalkylene diamine (XTJ-500, Huntsman Corp.) and 0.0986 g of phthalic anhydride was added. The solution was stirred for an additional 14 hours at 110° C. The solution was cooled and 50 g of acidic ion-exchange resin was added (Amberlyst 15). After filtration the solution was cast onto a stainless plate and heated to 100° C. for 14 hours and then at 200° C. for 2 hours under vacuum.

EXAMPLE 4

Synthesis of a Linear Rod-Coil Polymer

A mixture of 3.72 g 3,3',4,,4'-benzophenonetetracarboxylic dianhydride and 15.55 g of a mixture of polyoxyethylene diamine and polyoxypropylene diamine and 0.59 g phthalic anhydride in 30 ml anhydrous tetrahydrofuran was stirred for 24 hours at room temperature under inert conditions to dissolve. 4,4'-diaminobenzene (0.62 g) was added along with another 20 ml tetrahydrofuran and stirring was continued for another 3 hours. The resultant highly viscous polyamic acid solution was cast onto a flat plate. The resultant film was dried at 30° C. for 24 hours. After drying, it was cured in a vacuum oven at 200° C. for 3 hours to give 20 g of rubbery, polyimide film.

EXAMPLE 5

Synthesis of a Sulfonated Rod-Coil Polymer

To stirred solution of 4.116 g of 3,3',4,4'-benzophenonetetracarboxylic dianhydride (BTDA) in 50 ml of dry 1-methyl-2-pyrrolidinone (N) was added 2.194 g of 4,4'diamino-2,2'-biphenylidisulfonic acid and 2.22 ml of triethylamine. The solution was stirred at 110° C. for 6 hours then 4.032 g of a mixture of polyoxyethylene diamine and polyoxypropylene diamine and 0.0986 g of phthalic anhydride was added. The solution was stirred for an additional 14 hours at 110° C. The solution was cooled and 50 g of acidic ion-exchanged resin was added (Amberlyst 15). After filtration the solution was cast onto a stainless plate and heated to 100° C. for 14 hours and then at 200° C. for 2 hours under vacuum.

EXAMPLE 6

Synthesis of a Sulfonated Rod-Coil Polymer

To stirred solution of 4.116 g of 3,3',4,4'-benzophenonetetracarboxylic dianhydride (BTDA) in 50 ml of dry 1-methyl-2-pyrrolidinone (NMP) was added 2.194 g of 4,4'diamino-2,2'-biphenylidisulfonic acid and 2.22 ml of triethylamine. The solution was stirred at 110° C. for 6 hours then 4.032 g of polyoxyethylene diamine and 0.0986 g of phthalic anhydride was added. The solution was stirred for an additional 14 hours at 110° C. The solution was cooled and 50 g of acidic ion-exchanged resin was added (Amberlyst 15). After filtration the solution was cast onto a stainless plate and heated to 100° C. for 14 hours and then at 200° C. for 2 hours under vacuum.

In preparing the rod-coil block polyimide copolymers of this invention, the following are examples of the anhydrides i.e. mono and dianhydrides reacted with stoichiometric amounts of the amines i.e. the mono and polyamines and polyoxyalkylene diamines in the ratio of about 20 to 50 parts by weight of the anhydrides to about 50 to 80 parts by weight of the amines i.e. the mono and polyamines and polyoxyalkyl diamine. The dianhydrides include, for example, ethylenetetracarboxylic dianhydride, butanetetracarboxylic dianhydride, cyclopentanetetracarboxylic dianhydride, pyromellitic dianhydride, 3,3',4,4'-benzophenonetetracarboxylic dianhydride, 2,2',3,3'-benzophenonetetracarboxylic dianhydride, 3,3',4,4'-biphenyltetracarboxylic dianhydride, 2,2',3,3'-biphenyltetracarboxylic dianhydride, 2,2-bis(3,4-dicarboxyphenyl)propane dianhydride, 2,2-bis(2,3-dicarboxyphenyl)propane dianhydride, bis(2,3-dicarboxyphenyl)ether dianhydride, bis(3,4-dicarboxyphenyl)ether dianhydride, bis(2,3-dicarboxyphenyl)sulfone dianhydride, bis(3,4-dicarboxyphenyl)sulfone dianhydride, bis(2,3-dicarboxyphenyl)methane dianhydride, bis(3,4-dicarboxyphenyl)methane dianhydride, 1,1-bis(2,3-dicarboxyphenyl)ethane dianhydride, 1,1-bis(3,4-dicarboxyphenyl)ethane dianhydride, 1,2-bis(2,3-dicarboxyphenyl)ethane dianhydride, 1,2-bis(3,4-dicarboxyphenyl)ethane dianhydride, 1,3-bis(2,3-dicarboxyphenoxy)benzene dianhydride, 1,3-bis(3,4-dicarboxyphenoxy)benzene dianhydride, 1,4-bis(2,3-dicarboxyphenoxy)benzene dianhydride, 1,4-bis(3,4-dicarboxyphenoxy)benzene dianhydride, 2,3,6,7-naphthalenetetracarboxylic dianhydride, 1,4,5,8-naphthalenetetracarboxylic dianhydride, 1,2,5,6-naphthalenetetracarboxylic dianhydride, 1,2,3,4-benzenetetracarboxylic dianhydride, 3,4,9,10-perylenetetracarboxylic dianhydride, 2,3,6,7-anthracenetetracarboxylic dianhydride, and 1,2,7,8-phenanthrenetetracarboxylic dianhydride. Exemplary dicarboxylic monoanhydrides include phthalic anhydride, 2,3-benzophenonedicarboylic anhydride, 3,4-benzophenonedicarboxylic anhydride, 2,3-dicarboxyphenyl phenylether anhydride, 3,4-dicarboxyphenyl phenylether anhydride, 2,3-biphenyldicarboxylic anhydride, 3,4-biphenyldicarboxylic anhydride, 2,3-dicarboxyphenyl phenylsulfide anhydride, 3,4-dicarboxyphenyl phenylsulfide anhydride, 1,2-naphthalenedicarboxylic anhydride, 2,3-naphthalenedicarboxylic anhydride, naphthalenedicarboxylic anhydride, 1,2-anthracenedicarboxylic anhydride, 2,3-anthracenedicarboxylic anhydride and 1,9-anthracenedicarboxylic anhydride. The anhydrides and amines can be used singly or as a mixture in various ratios.

Some of the organic solvents used in preparing the block copolymers include, for example, N,N-dimethylformamide; N,N-dimethylacetamide; N,N-diethylacetamide; N,N-dimethylmethoxyacetamide; N-methyl-2-pyrrolidone; bis (2-methoxyethyl)ether, tetrahydrofuran; 1,3-dioxane; pyridine; dimethyl sulfoxide; dimethyl sulfone; cresol; cresylic acid; xylenol and various mixtures thereof.

The sulfonated diamines i.e. the aromatic and aliphatic diamines useful in preparing the rod-coil copolymers can be characterized as having the general formula:

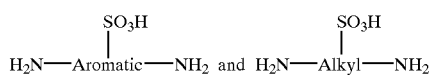

wherein the preferred aromatic radicals in the above formula are characterized by the aromatic radicals selected from the group consisting of:

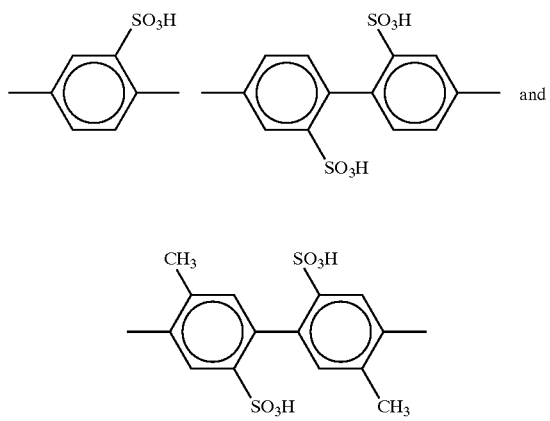

The sulfonated aliphatic or alkyl diamines contain alkyl groups having up to eight carbon atoms or higher and preferably up to four carbons. Specific examples of sulfonated aromatic diamines preferably include 1,4-diaminobenzene-3-sulphonic acid; 4,4'-diamino-1-1-biphenyl-2,2'-disulphonic acid; 4,4'-diamino-2,2'-biphenyldisulfonic acid and various combinations thereof. In addition to the sulfonate group i.e. the sulfonated alkyl or aryl diamines, other strong acid groups that provide high ionic conductivity in the polymeric membranes include carboxylic acid, phosphoric acid and the like.

The amines useful in preparing the block copolymers include the monamines, triamines and diamines, e.g. aromatic diamines containing at least one benzene ring including, for example: para-phenylenediamine, 4,4'-diamino-diphenylpropane, 4,4'-diamino-diphenylmethane, diamine benzene, 1,5-diamino-napthalene, bisaniline-p-xylidene, 3,3'-diaminobenzopheneone, 4,4'-diaminobenzophenone, 3,3'-diaminodiphenylether, 4,4'-diaminodiphenylmethane, 3,3'-dimethyl benzidine and various triamines such as 1,3,5-triaminobenzene, 4,4',4"-triaminotriphenylmethane, 4,4',4"-triaminotriphenylcarbinol and triaminophenyl benzene. The monoamines include, for example, the aromatic monoamines, aniline, o-toluidine, 2,3-xylidine, 3,4-xylidine, o-aminophenol, m-aminophenol, m-phenetidine, m-aminobenzaldehyde, aminobenzaldehyde, aminobenzonitrile, aminobenzonitrile, 2-aminobiphenyl, 4-aminobiphenyl, 2-aminophenyl phenyl ether, 3-aminophenyl phenyl ether, 2-aminobenzophenone, 3-aminobenzophenone, 3-aminophenyl phenyl sulfide, naphthylamine, amino-2-naphthol, 2-amino-1-naphthol and the like.

For purposes of this invention, the preferred polyoxyalkylene diamines are alkylene diamines wherein the alkylene group has from 2 to 8 carbons or higher, and preferably from 2 to 4 carbons such as polyoxyethylene diamine, polyoxypropylene diamines, polyoxybutylene diamine and various mixtures thereof.

In preparing lithium-based polymer batteries with the rod-coil polyimide copolymer films of this invention, the lithium compounds are used as the electrolyte generally dissolved in solvent. Although the solvents are not limited, the following examples include the carbonates such as ethylene carbonate, dimethoxyethane, butyllactone, diethylether, tetrahydrofuran, methyl-tetrahydrofuran, dioxolan, acetonitrile, and the lower alkyl carbonates such as methylcarbonate, and methylpropylcarbonate and the like. In lithium batteries, one or more lithium compounds, preferably the salts can be used including, for example: $LiClO_4$, $LiBF_4$, LiCl, $LiSO_3CH_3$, $LiSO_3CF_3$, $LN(SO_2CF_3)_2$ and $LiC(SO_2CF_3)_3$ and various combinations thereof.

While this invention has been described with the preferred embodiments, it will be appreciated that various modifications and variations will be apparent to one skilled in the art and that such modifications and variations are within the scope of the appended claims.

The invention claimed:

1. Mechanically resilient polymeric films having ionic conductivity at various temperatures comprising rod-coil block copolymers having the formula:

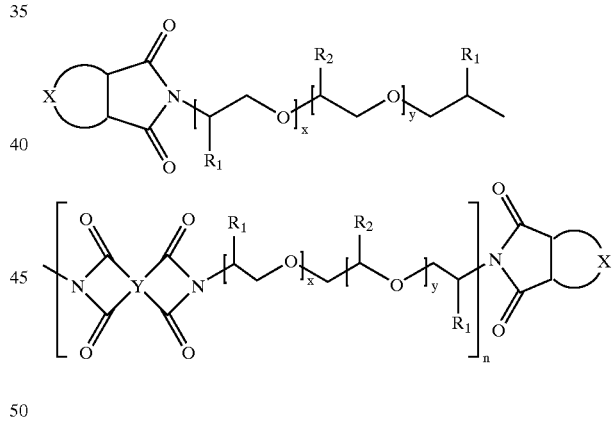

wherein Y is an organic radical, $R_1$ is selected from the group consisting of hydrogen alkyl radicals, and alkoxy radicals, $R_2$ is selected from the group consisting of hydrogen, alkyl radicals, and alkoxy radicals, X is selected from the group consisting of aromatic radicals, heterocyclic radicals and aliphatic radicals, and x is equal to or greater than zero, y is equal to or greater than zero, and n is equal to or greater than one, and wherein the films are doped with effective amounts of a lithium compound providing lithium ion conductivity.

2. Mechanically resilient polymeric films having ionic conductivity at various temperatures comprising the rod-coil block copolymers of claim 1 wherein Y is an aromatic radical having the formula:

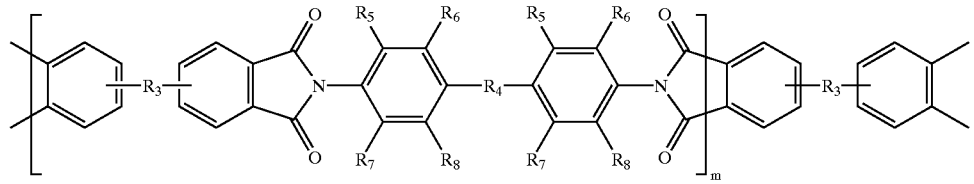

wherein $R_3$ and $R_4$ are the same or different and are selected from the group consisting of nil, carbon radicals, oxygen, methylene radical, and hexafluoroisopropylidene radical, $R_5$, $R_6$, $R_7$, and $R_8$ are selected from the group consisting of hydrogen, F, $CF_3$, lower alkyl radicals, lower alkoxy radicals, sulfonate radicals, and alkyl sulfonate radicals, and m is equal to or greater than one, and wherein the films are doped with effective amounts of a lithium compound providing lithium ion conductivity.

3. The mechanically resilient polymeric films of claim 1 wherein the lithium compound is selected from the group consisting of $LiClO_4$, $LiBF_4$, LiCl, $LiSO_3CH_3$, $LiSO_3CF_3$, $LiN(CF_3SO_2)_2$, and $LiC(SO_2CF_3)_3$.

4. The mechanically resilient polymeric films of claim 3 wherein the lithium compound is $LiN(CF_3SO_2)_2$.

* * * * *